Figure 1A:
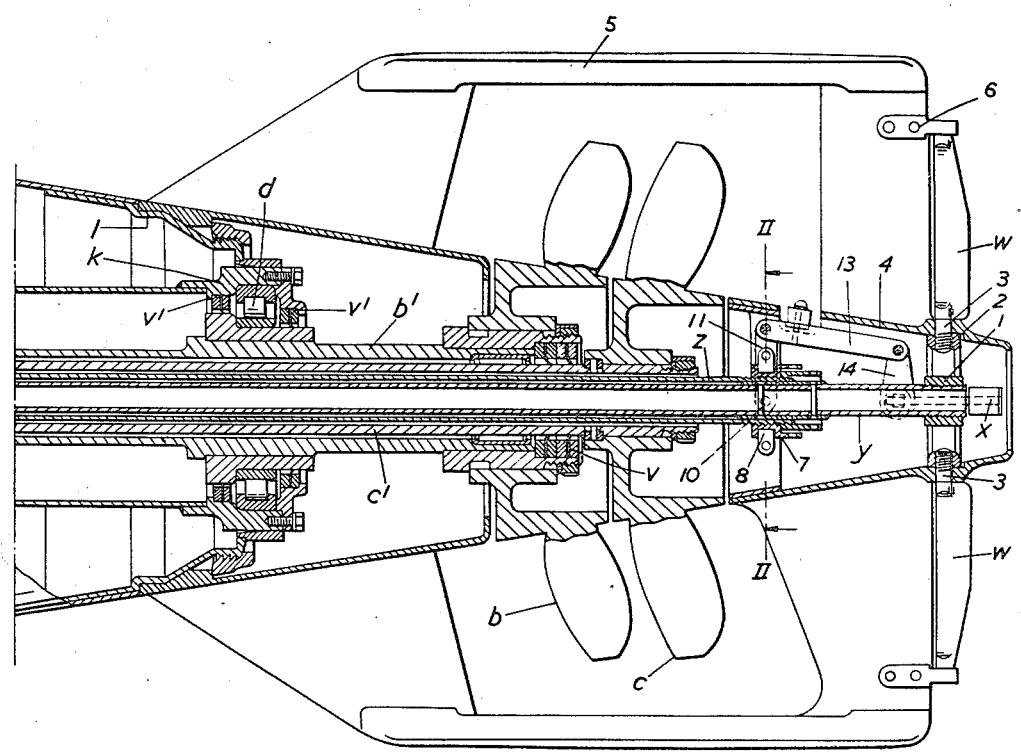

Jan. 28, 1947.  A. H. CHILTON  2,414,928
ELECTRICALLY PROPELLED TORPEDO
Filed May 11, 1942  2 Sheets-Sheet 1
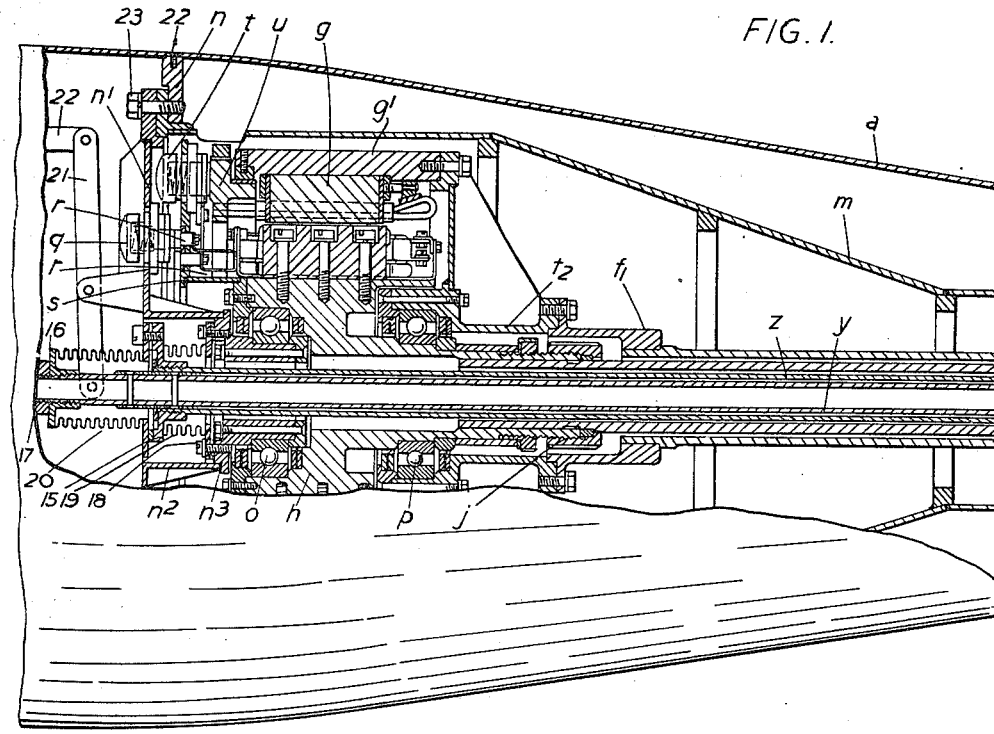
FIG. 1.
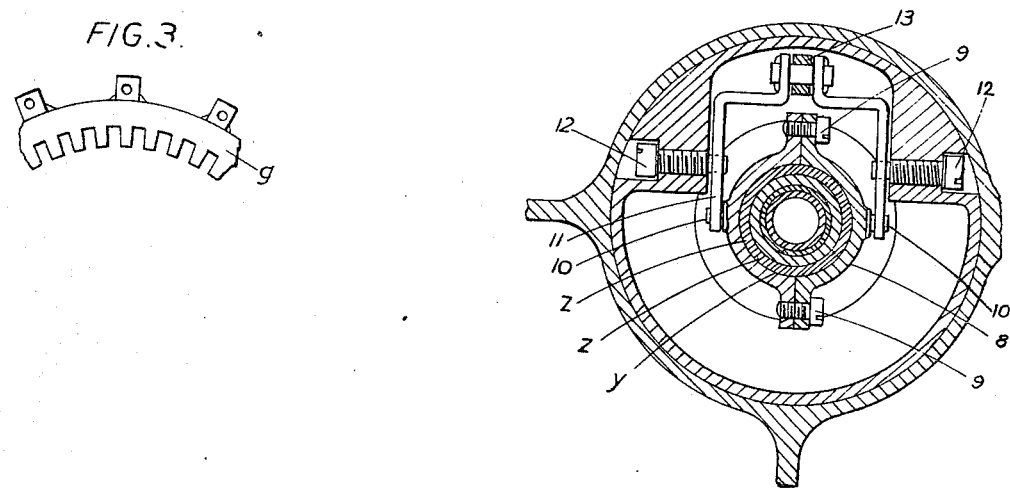
FIG. 3.
FIG. 2.
Alfred Henry Chilton
INVENTOR
BY Loyd Hall Sutton
ATTORNEY Patented Jan. 28, 1947

2,414,928

UNITED STATES PATENT OFFICE 2,414,928

ELECTRICALLY PROPELLED TORPEDO

Alfred Henry Chilton, Deptford, England, assignor to J. Stone & Company Limited, Deptford, England, a company of Great Britain Application May 11, 1942, Serial No. 442,477
In Great Britain January 27, 1941

7 Claims. (Cl. 114—20)

This invention relates to improvements in and connected with electrically propelled torpedoes and has for its object to provide a power installation which is compact and of relatively light weight and which presents a number of advantages in connection with the production and running of such torpedoes.

Heretofore, it has been proposed to drive the tandem propellers of an electric torpedo through the medium of a reduction and reverse drive gearing, the reduction gearing enabling the high speed of the electric motor to be appropriately reduced to suit the speed for which the propellers are designed and the reverse gearing providing for the driving of one propeller in the opposite direction to that of the other propeller. Such gearings occupy valuable space in a torpedo and also represent a load which could advantageously be dispensed with.

According to this invention, the two concentric shafts of tandem propellers are directly driven by respective electric motor components mounted for revolution in opposite directions. The concentric shafts may both be hollow so that the rudder and elevator controls can be passed through the bore of the inner shaft. In carrying out the invention, it is advantageous to arrange the revolving field magnet component centrally and the revolving armature component around the field magnet component. The commutator brushes of the armature may be supplied with current from slip rings having laterally presented surfaces which are contacted by horizontal spring brush contacts mounted in a bulkhead which suitably closes one end of the motor compartment.

The direct driving of the propeller shafts by reversely rotating motor components renders the employment of gearing unnecessary, the motor speed being halved when thus transmitted to the two shafts, which is a sufficient speed reduction with normal motor design particularly if the propellers are possibly designed for a somewhat higher working speed than is usual. By this means, not only are space and weight saved but there is complete balance of the torque of one propeller against that of the other.

When the operating rods controlling the horizontal and vertical rudders of the torpedo are passed through the hollow concentric shafts, these rods emerge through a bulkhead for connection with their respective operating levers and are advantageously packed by means of a suitable flexible packing preferably having the form of a metallic bellows packing. This ensures a watertight joint without interfering with the control movements of the rods.

The double rotation motor may be arranged as a complete unit in an outer shell in which the propeller end bearing is integral with and forms part of the motor unit. If desired, the motor, propeller end bearing and the outer shell forming the aft section of the torpedo may be constructed as a complete unit and this may involve designing a motor of relatively small diameter but long core. In either case, it is possible to design the motor with such a reduced overall diameter that it is possible to locate the motor adjacent to the propellers and so minimize the length of propeller shafting employed and attain compactness for the installation. In this connection, it may be observed that in a normal D. C. motor with the field magnet as the outer component, the encircling magnet yoke forms a considerable proportion of the total weight of the machine. By arranging the field magnet as the inner component, however, the weight of the magnet yoke for a given gap diameter is considerably reduced for the said yoke then becomes merely the boss or hub of the inner component. Thus for a given gap diameter, the outside diameter of the motor can be substantially reduced. Such reduction is enhanced by making the armature slots as shallow as possible and by adopting a multipolar design so as to allow of a reduction in the depth or thickness of the armature core at the back of the slots.

The direct drive of these improvements has further advantages which may be briefly referred to. First, a minimum number of bearings is required and four only may suffice, those for the motor components being advantageously two ball bearings. Second, the brush gear is readily accessible through the bulkhead aforesaid. Thirdly, a simplification is effected in addition to an economy in weight and space.

In regard to the balancing of the torque reactions above referred to it may be observed that under any conditions, the torques exerted by the two motor components are necessarily the same being the total motor torque applied so as to act equally and oppositely in two directions. Consequently, there is no possibility of either of the rotating components exerting torque reaction on the body of the torpedo. Therefore, there can be no tendency for the torpedo to revolve and thereby interfere with the settings of its rudder controls. Any difference which there may be between the two propellers will merely result in different speeds of revolution but this will have no torque effect whatever upon the torpedo itself.

When tandem propellers are driven through gearing, the speed of one is precisely equal to that of the other although in the opposite direction. In order to obtain a balance of torque reactions in such cases, and particularly with the high speeds that may be involved, it was heretofore necessary to match the propellers as closely as possible one with the other. This involved very expensive and highly skilled finishing operations. With the propellers driven directly by oppositely revolving motor components in accordance with this invention, however, such close matching of the propellers is unnecessary because whatever reaction is due to one propeller in revolution will be automatically balanced by the reaction due to the other propeller. Thus the expensive and troublesome matching of the propellers is dispensed with. Moreover, if during use one propeller should suffer injury or deformation, the said balance of torque reactions will nevertheless be preserved, whereas with propellers driven through gearing such balance would be lost so that deterioration in the running of the torpedo under automatic steerage and elevator control would occur.

If the torpedo is to be launched into the sea from an aircraft, it may be provided with automatic switching means adapted for closing the motor circuit only when the speed of the torpedo in the water, and therefore the propeller speed, has fallen to near that speed at which the motor is rated for the propulsion of the torpedo.

In order to enable the invention to be readily understood, reference is made to the accompanying drawings, wherein:

Figures 1 and 1A show a longitudinal sectional elevation of the stern portion of a torpedo in which is housed an electric motor and controls arranged in accordance with the present improvements, Figure 2 is a cross section to a larger scale on the line II—II of Figure 1, and Figure 3 is a detail view showing a fragment of the armature component in end elevation.

Referring to Figure 1, $a$ is the skin of the stern portion of a torpedo which is to be propelled by the two oppositely revolving propellers $bc$ arranged coaxially one behind the other. The propeller $b$ is keyed to a hollow shaft $b^1$ supported in a stern bearing $d$ of the roller variety and the propeller $c$ is keyed to a hollow shaft $c^1$ extending concentrically through the shaft $b$ and supported within the latter by a stern roller bearing $e$.

At its inner end, the shaft $b^1$ is rigidly connected by a divided coupling member $f^1f^2$ with the outer component $g$ of an electric motor which component in this instance is the armature and encloses the field magnet component $h$. The latter is connected by a coupling member $j$ with the inner hollow shaft $c^1$. The field magnet component is advantageously of multipolar construction. The armature component $g$, as will be seen from Figure 3, is formed with shallow slots, the thickness at the back of these slots being relatively small in view of the multipolar construction. If the armature component $g$ were supported by enclosing it within a continuous tube or casting, this would add considerably to the weight. To avoid such increase in weight, the armature component $g$ is supported by enclosing the stampings of which it is composed in a cage of slats $g^1$ which are welded to the stampings and are secured at their extremities to end parts of the rotor.

The support $k$ for the bearing $d$ is fixedly mounted in a hollow plug part $l$ fixed within the tapering extremity of the skin $a$ of the torpedo. The support $k$ has connected with it the small end of a tapering housing or framing $m$ the large end of which extends around the armature $g$ and is connected with a bulkhead ring $n$ of the torpedo. A bulkhead plate $n^1$ is bolted to the ring $n$ and around a central hole therein is formed or provided with a horizontal cylindrical part $n^2$ in the free end of which is fixed a support $n^3$ for a ball bearing $o$ on which the field magnet component $h$ runs. The armature $g$ runs on a ball bearing $p$ disposed between its coupling member $f^2$ and a hub part of the field magnet.

The bulkhead plate $n^1$ supports horizontal spring brushes $q$ (only one of which is seen in Figure 1) which press against slip rings $r$ on the field magnet component for the supply of current to the motor. As will be seen, the slip rings $r$ are carried by an annular disc $s$ fixed on the end of the field magnet component $h$ and this disc $s$ supports horizontal spring brushes $t$ which press against the vertical face of a commutator ring $u$ of the armature component $g$. The necessary connections are made between the slip rings $r$ and brushes $t$. Upon supplying current to the terminal brushes $t$, the field magnet component $h$ will revolve in one direction and the armature component $g$ will revolve in the opposite direction, thereby driving the two propellers $bc$ in opposite directions, as required.

Between the hub of the propeller $b$ and the shaft $c^1$ of the propeller $c$, packings $v$ are provided to prevent entry of water. Also, and for the same purpose, packings $v^1$ are provided on each side of the stern bearing $d$. Similar packings are shown in connection with the bearings $o$ and $p$.

The steering rudder $w$ and the elevator rudder $x$ shown in dotted lines in Figure 1, are operated by concentric hollow rods $yz$ which are passed through the hollow propeller shaft $c^1$. The inner rod $y$ has fixed to its end a hub 1 having a horizontally extending arm (not seen) which engages with a swivel ring 2 into which are screwed the pins or stems 3 of the rudders $w$. The pins 3 have bearings in a hollow conical part 4 supported by a stern framing 5 which has bearing brackets 6 for the outer swivel pins of the rudders $w$. The outer hollow rod $z$ has fixed to it a grooved hub 7 and in the groove of this part there is engaged a two-part ring 8 the parts of which are clamped together by screws 9 Figure 2. Trunnion pins 10 on the ring 8 pivotally engage the ends of a forked lever 11 pivoted on pins 12. The upper end of the forked lever 11 is pivotally connected with a link 13 which as seen in Figure 1, is pivotally connected with a crank arm 14 on the pivot axle of the elevator rudder $x$. To the forward end of the rod $z$ there is screwed a flange member 15 and to the forward end of the rod $y$ there is screwed a flange 16, the forward end of the rod $y$ being closed water tightly by a cap 17. Between the flange 15 and an annular disc 18 secured to the ball bearing support $n^2$, there is inserted a metallic bellows packing 19 and between the flanges 15 and 16 there is inserted a second bellows packing 20. The cap 17 and the bellows packings 19 and 20 prevent ingress of water by way of the rod $y$, or by way of the space between the rods $y$ and $z$, or by way of the space between the rod $z$ and the inner propeller shaft $c^1$, the bellows packings nevertheless permitting the rods $y$ and $z$ to be moved longitudinally for transmitting control operations to the rudders. The rod $y$ may be operated by a lever 21 to which angular movements are transmitted by means of a link 22 extending to suitable control means. The rod $z$ may similarly be operated by a lever, not shown, operatively connected with the flange member 15.

The arrangement of the control rods within the hollow shafts as above described is advantageously adopted in the case of a torpedo having outboard rudder and fins as shown in the drawings. In some torpedoes the rudders are attached to the fins forward of the propellers and the outboard fins shown in the drawings are dispensed with. In such torpedoes, the control rods may be arranged externally of the motor.

It will be seen from Figure 1, that if the aft end portion of the torpedo is divided from the body of the torpedo approximately at the place where it is shown broken away and made readily attachable thereto and detachable therefrom, then by detaching the aft end portion illustrated the motor compartment is made readily accessible. If it is desired to withdraw the motor for inspection or repair, the propellers are removed, the rods $y$ and $z$ are disconnected from their respective rudders, and screws 22 securing the bulkhead ring $n$ within the skin $a$ are removed, or the bolts 23 securing the bulkhead plate $n^1$ to the ring $n$ are removed. The complete motor aggregate including the motor propeller shafts, control rods and stern bearing is then withdrawable as a separate unit.

As hereinbefore mentioned, the construction involves only a minimum number of bearings, namely four, there being the bearing $e$ between the shafts $b^1 c^1$, the bearing $d$ between the shaft $b^1$ and the casing, the bearing $o$ between the bulkhead and the field magnet component $h$, and the bearing $p$ between the two motor components $g$ and $h$. The supporting of the motor on two bearings only within the motor not only reduces weight and expense but also facilitates the lining up between the motor couplings and the propeller shafts.

Heeling over of a torpedo due to torque reaction is calculated seriously to impair direction and depth-keeping and heeling to the extent of 90° from the even keel position is likely to cause the torpedo to go completely out of control. The balancing of torque reactions in electric torpedoes as above described is an important feature which, together with the inherently steep power speed characteristics of a compound wound electric motor supplied from a battery at a high discharge rate, is conducive to the accurate aiming of such torpedoes. Any tendency for one propeller to run at a greater speed, automatically results in a tendency for the motor speed to be reduced. This is due to the operation of the well-known propeller law that the power absorbed varies as the cube of the speed. Consequently, an automatic balancing effect occurs in favour of both propellers running at their correct speeds, whether these speeds are the same as one another or different. In the transmission as a whole, there are no rubbing parts and no connection whatever between the rotating members and the shell of the torpedo which could transmit any appreciable torque to the shell under any conditions.

Finally, an important advantage in an electric torpedo in accordance with these improvements is the inherent large reduction in the gyroscopic effect of parts having relatively high inertia and rotating at relatively high speed, particularly because such gyroscopic effect is liable to interfere with the operation of the torpedo when turning. The revolving part of a motor may be regarded as a gyroscope and when a torpedo is turned in a horizontal plane by its vertical rudders, there appears a gyroscopic couple at right angles to the axis of the gyroscope and at right angles to the direction of the disturbing force applied by such vertical rudders. Thus, any attempt to turn the torpedo results in a couple being exerted on the torpedo in a vertical plane tending to depress or raise the nose. This effect is of importance because torpedoes are sometimes launched, particularly from aircraft, in a direction different from that in which they are intended to travel when in the water, the vertical rudders operating to cause the torpedo to turn from the launching direction after entry of the torpedo into the water. With the double rotation motor in accordance with these improvements, the two rotating components may be regarded as gyroscopes rotating in opposite directions the gyroscopic couple exerted by one component being in the opposite direction to that exerted by the other component. There is thus a large reduction or obliteration of gyroscopic influence or overall effect on the torpedo.

I claim:

1. An electric torpedo comprising two coaxial propellers arranged one behind the other and adapted for revolution simultaneously in opposite directions, wherein the two propellers are mounted on concentric shafts one of which is directly driven by the field magnet component of the electric motor and the other by the armature component of that motor, the two components being freely revoluble in opposite directions.

2. Electric torpedo comprising in combination two coaxial tandem propellers adapted for revolution simultaneously in opposite directions, two concentric propeller shafts, a revolubly mounted armature constructed as the outer component of an electric motor and connected with one of said shafts, and a revolubly mounted field magnet component enclosed by said armature and connected with the other of said shafts.

3. Electric torpedo comprising in combination two coaxial tandem propellers adapted for revolution simultaneously in opposite directions, two concentric propeller shafts, a revolubly mounted armature constructed as a laminated annular structure enclosed within a cage of slats and connected with one of said shafts, and a revolubly mounted multi-polar field magnet structure enclosed by said armature and connected with the other of said shafts.

4. Electric torpedo comprising in combination two co-axial tandem propellers adapted for revolution simultaneously in opposite directions, two concentric propeller shafts, a revolubly mounted armature constructed as the outer component of an electric motor and connected with one of said shafts, a revolubly mounted field magnet component enclosed by said armature and connected with the other of said shafts, a commutator ring mounted on said armature to present a vertical contact face, commutator brushes mounted horizontally on said field magnet component to work on said vertical contact face, slip rings mounted in a vertical plane on said field magnet component, and terminal brushes supported horizontally to work against said slip rings.

5. Electric torpedo comprising in combination two coaxial tandem propellers adapted for revolution simultaneously in opposite directions, two concentric hollow propeller shafts, a revolubly mounted armature constructed as the outer component of an electric motor and connected with one of said shafts, a revolubly mounted field magnet component enclosed by said armature and connected with the other of said shafts, concentric control rods extending through said shafts and connected between rudder and elevator components and internal operating means, and expansible packing means operative for permitting longitudinal operational movements of said rods whilst preventing ingress of water.

6. Electric torpedo comprising in combination two coaxial tandem propellers adapted for revolution simultaneously in opposite directions, two concentric hollow propeller shafts, a bearing between these shafts at the tail end, a bearing between the tail end of the outer shaft and the hull of the torpedo, an armature constructed as the outer component of an electric motor and connected with one of said shafts, a revoluble field magnet component enclosed by said armature and connected with the other of said shafts, a bearing disposed between said armature and said field magnet component, and a bearing for the latter supported by the hull of the torpedo.

7. Electric torpedo comprising in combination two coaxial tandem propellers adapted for revolution simultaneously in opposite directions, two concentric hollow propeller shafts detachably connected with respective propellers, a bearing between these shafts at the tail end, a bearing for the tail end of the outer shaft detachably connected with the hull of the torpedo, an armature constructed as the outer component of an electric motor and connected with one of said shafts, a revoluble field magnet component enclosed by said armature and connected with the other of said shafts, a bearing disposed between said armature and said field magnet component, a bulkhead incorporating a detachable bulkhead plate defining one end of the motor compartment in said torpedo, and a bearing for said field magnet component supported by the detachable bulkhead plate, detachment of said bulkhead plate and of said bearing detachably connected with the hull enabling the motor installation to be withdrawn as a unit after detachment of the propellers from their shafts.

ALFRED HENRY CHILTON.